United States Patent
Livens et al.

(10) Patent No.: US 10,578,434 B2
(45) Date of Patent: Mar. 3, 2020

(54) SYSTEM AND METHOD FOR PROCESSING IMAGES OF A GROUND SURFACE

(71) Applicant: VITO NV, Mol (BE)

(72) Inventors: Stefan Livens, Mol (BE); Bavo Delaure, Mol (BE)

(73) Assignee: VITO NV, Mol (BE)

( * ) Notice: Subject to any disclaimer, the term of this patent is extended or adjusted under 35 U.S.C. 154(b) by 0 days.

(21) Appl. No.: 15/556,847

(22) PCT Filed: Apr. 14, 2016

(86) PCT No.: PCT/EP2016/058297
§ 371 (c)(1),
(2) Date: Sep. 8, 2017

(87) PCT Pub. No.: WO2016/166257
PCT Pub. Date: Oct. 20, 2016

(65) Prior Publication Data
US 2018/0051987 A1    Feb. 22, 2018

Related U.S. Application Data

(60) Provisional application No. 62/147,193, filed on Apr. 14, 2015.

(30) Foreign Application Priority Data

Apr. 14, 2015    (GB) .................................. 1506329.0

(51) Int. Cl.
*G01C 11/26* (2006.01)
*G01C 11/02* (2006.01)

(52) U.S. Cl.
CPC .............. *G01C 11/26* (2013.01); *G01C 11/02* (2013.01)

(58) Field of Classification Search
CPC .................................. G01C 11/26; G01C 11/02
See application file for complete search history.

(56) References Cited

U.S. PATENT DOCUMENTS

| 4,309,104 A | 1/1982 | Prinz et al. |
| 4,802,757 A * | 2/1989 | Pleitner ................. G01C 11/04 356/139.03 |

(Continued)

FOREIGN PATENT DOCUMENTS

| CN | 101635798 A | 1/2010 |
| CN | 104079834 A | 10/2014 |

(Continued)

OTHER PUBLICATIONS

International Search Report (ISR) dated Jul. 29, 2016, for PCT/EP2016/058297.

(Continued)

*Primary Examiner* — Oschta I Montoya
(74) *Attorney, Agent, or Firm* — Bacon & Thomas, PLLC

(57) ABSTRACT

A method for taking partially overlapping images of a ground surface from a camera arranged in an aircraft or a spacecraft, the method including: while the aircraft or the spacecraft is moving, acquiring images at different instants in time, separated by time intervals; detecting, during the moving, position information representative of a position and orientation information representative of an orientation of the aircraft of the spacecraft; using the position information, the orientation information, and the camera's viewing angle to determine maximal values of time intervals for which images with a predetermined amount of spatial overlap can be obtained; and adjusting the intervals towards the maximal values so as to minimize the number of the acquired images while maintaining the predetermined amount of spatial overlap.

12 Claims, 7 Drawing Sheets apparent ground distance covered when pitch changed from to $\theta_1$ to $\theta_2$

(56) References Cited

U.S. PATENT DOCUMENTS

2011/0157459 A1* 6/2011 Chen ............... H04N 5/232
                                                    348/367
2014/0320650 A1* 10/2014 Hong ............... H04N 7/185
                                                    348/144

FOREIGN PATENT DOCUMENTS

| EP | 0053640 A1 | 6/1982 |
| EP | 0498542 A2 | 8/1992 |
| WO | 2011073430 A1 | 6/2011 |

OTHER PUBLICATIONS

Written Opinion dated Jul. 29, 2016, for PCT/EP2016/058297.
British Search Report dated Oct. 21, 2015, for GB 1506329.0.
Chinese Office Action in corresponding Chinese Application No. 201680021782.4, dated Sep. 10, 2019.

* cited by examiner

SYSTEM AND METHOD FOR PROCESSING IMAGES OF A GROUND SURFACE

The invention relates to the field of image capturing, such as multi-spectral or hyperspectral image capturing, in particular in the context of earth observation using a camera arranged in an aircraft.

BACKGROUND OF THE INVENTION

In earth observation satellite and aerial imaging, current sensor technology allows to capture high resolution images at high speed, creating vast amounts of data. To cover large areas without gaps, series of images are taken at regular time intervals (expressed as frame rates), while the airborne platform moves forward with an intentional nominal forward speed. However, platforms unavoidably also exhibit some unwanted movement known as platform attitude variation. This influences the pointing angles, and thus the imaged areas, in a generally unpredictable way. To avoid gaps in the imaging, frame rates are usually increased, which in turn increases the data volumes. The actually required data volumes may exceed the downlink and/or storage capacity of aircraft-mounted systems. This problem occurs in all imaging systems, including panchromatic imaging systems as well as multispectral imaging systems (whether mosaic-based, or line-based as described below).

The limits of the downlink and/or storage capacity of the systems become particularly pressing in the case of multi-spectral imaging, where the total amount of data is multiplied by the number of spectral bands, and a fortiori in the case of hyperspectral imaging. Hyperspectral imaging is a form of spectral imaging wherein information from across the electromagnetic spectrum is collected in many narrow spectral bands and processed. From the different spectral images that are collected, information of the objects that are imaged can be derived. For example, as certain objects leave unique spectral signatures in images which may even depend on the status of the object, information obtained by multi-spectral imaging can provide information regarding the presence and/or status of objects in a region that is imaged. After selection of a spectral range that will be imaged, as spectral images in this complete spectral range can be acquired, one does not need to have detailed prior knowledge of the objects, and post-processing may allow to obtain all available information.

In some applications, multi-spectral data can be obtained by collecting a full two dimensional image of a region in one spectral range of interest and by subsequently collecting other full two dimensional images of that region in other spectral ranges of interest whereby spectral filters are switched in between. This way of data collection nevertheless is not always possible, especially when the region of interest and the imaging system undergo a large relative movement with respect to each other.

International patent application publication WO 2011/073430 A1, in the name of the present applicant, discloses a sensing device for obtaining geometric referenced multi-spectral image data of a region of interest in relative movement with respect to the sensing device. The sensing device comprises a first two dimensional sensor element. The sensing device is adapted for obtaining subsequent multi-spectral images during said relative motion of the region of interest with respect to the sensing device thus providing spectrally distinct information for different parts of a region of interest using different parts of the first sensor. The sensing device also comprises a second two dimensional sensor element and is adapted for providing, using the second sensor element, an image of the region of interest for generating geometric referencing information to be coupled to the distinct spectral information.

While these arrangements are very compact, they require a very high image capturing frame rate to ensure sufficient spatial resolution over the entire desired spectral range. Accordingly, there is a need for efficient use of downlink and/or storage capacity of the described systems.

SUMMARY OF THE INVENTION

According to an aspect of the present invention, there is provided a method for taking a series of partially overlapping images of a ground surface from a camera arranged in an aircraft or a spacecraft, the camera having a viewing angle, the method comprising: while the aircraft or the spacecraft is moving, acquiring a plurality of images with the camera at different instants in time, the different instants in time being separated by a series of time intervals; detecting, during said moving, position information representative of a position of the aircraft or the spacecraft and orientation information representative of an orientation of the aircraft or the spacecraft; using the position information, the orientation information, and a viewing angle of the camera to determine maximal values of the time intervals for which images with a predetermined amount of spatial overlap can be obtained; and adjusting the intervals towards the maximal values so as to minimize the number of the acquired images while maintaining the predetermined amount of spatial overlap.

The term "aircraft", as used herein, is intended to designate both heavier-than-air aerial vehicles and airships. In particular, the term includes both manned and unmanned aerial vehicles (UAV), including those adapted to fly autonomously at stratospheric altitudes. The term "spacecraft", as used herein, is intended to designate both self-propelled and ballistic spacecraft, including orbital spacecraft such as satellites and space stations. The ground surface to be imaged may be the surface of the earth, or any other celestial body. The present invention is most advantageous for very small platforms because attitude variations are larger for those and accurate attitude determination more difficult.

It is an advantage of the present invention that the changes in attitude of the camera from one frame to the next are taken into account to determine the actual amount of overlap between consecutive frames (or intended frames), such that frames which represent more overlap than necessary with their neighbors—due to the camera pitching backward towards already imaged territory during the aircraft's forward movement—can be skipped or discarded. Thus, the amount of images that remains to be stored or transmitted is reduced, without sacrificing the quality in the resulting composite image.

In an embodiment of the method according to the present invention, the position information includes at least an altitude and a geographical position, and the orientation information includes at least a pitch; and the using of the position information and the orientation information to determine the maximal values of the time intervals comprises using the altitude, the geographical position, and the pitch to determine the maximal values of the time intervals.

In an embodiment of the method according to the present invention, a variation of the pitch is derived from consecutive ones of the plurality of images or from consecutive ones of a plurality of reference images acquired for that purpose by means of a secondary camera arranged in the aircraft or the spacecraft.

While the orientation information used to determine the maximal values of the time intervals may be measured by appropriate sensors, they may alternatively or additionally be estimated by analysis of consecutive images. In this case, a full attitude estimation is not necessary, as the desired pitch rate information can easily be extracted independently from the other attitude components. The images used for orientation estimation may be the images provided by the primary camera. However, it is also possible to provide a separate camera for the purpose of generating images that allow orientation estimation; this would for example be the case if the primary camera is of the line scanning type.

In an embodiment of the method according to the present invention, the acquiring comprises capturing images at a fixed capturing frequency and temporarily storing the captured images; and the adjusting of the intervals comprises discarding images from among the captured images so as to retain a minimal number of the images while maintaining the predetermined amount of spatial overlap.

It is an advantage of this embodiment that the camera can be operated at a very high frame rate, as according to present practice, and that the selection of desired frames can be performed after the image acquisition and prior to final storage or transmission. The frame rate may even be chosen to be higher than in the present practice, as the selection afterwards ensures that no unnecessary frames will have to be permanently stored or transmitted; this ensures a gapless reconstruction of the overall images even in the event of severe attitude variations during image capturing.

In a particular embodiment, the method further comprises transmitting the minimal number of the images from the aircraft to a ground station.

This is a particularly advantageous arrangement, where only temporary storage is performed aboard the aircraft, to reduce the necessary amount of storage media and thus the payload weight and volume.

In an embodiment of the method according to the present invention, the acquiring comprises capturing images at a variable capturing frequency; and the adjusting of the intervals comprises varying the capturing frequency.

It is an advantage of this embodiment that the camera can be operated at a variable frame rate, and that only the frames that are necessary to allow stitching together a high-quality image are actually acquired, thus further reducing the need for (temporary) storage of acquired images.

In an embodiment of the method according to the present invention, the determining comprises calculating an apparent ground speed as a sum of a variation of the geographical position and the product of the altitude and either a variation of the tangent of the pitch or a mathematical approximation thereof.

The inventors have found that this is a particularly efficient way of estimating the amount of overlap between consecutive image frames.

According to an aspect of the present invention, there is provided a computer program product comprising code means configured to cause a processor to carry out the method as described above.

According to an aspect of the present invention, there is provided a controller for facilitating the taking of a series of partially overlapping images of a ground surface from a camera arranged in an aircraft or a spacecraft, the controller being configured to: obtain an altitude, a geographical position, and a pitch of the aircraft during a movement; use the altitude, the geographical position, the pitch, and a viewing angle of the camera to determine maximal values of the time intervals for which images with a predetermined amount of spatial overlap can be obtained; and calculate time intervals between consecutive images maximized towards the maximal values so as to minimize the number of images required to maintain a predetermined amount of spatial overlap.

According to an aspect of the present invention, there is provided a system for taking a series of partially overlapping images of a ground surface, the system comprising: a camera arranged in an aircraft or a spacecraft; the controller as described above, arranged to control an image acquisition rate of the camera in accordance with the calculated time intervals.

According to an aspect of the present invention, there is provided a system for taking a series of partially overlapping images of a ground surface, the system comprising: a camera arranged in an aircraft or a spacecraft, the camera being configured to acquire images at a fixed image acquisition rate; the controller as described above, arranged to control storage and/or transmission of a subset of the acquired images in accordance with the calculated time intervals.

In an embodiment of a system according to the present invention, the aircraft or the spacecraft is an unmanned aerial vehicle.

In an embodiment of a system according to the present invention, the aircraft or the spacecraft is an air ship.

In an embodiment of a system according to the present invention, the aircraft or the spacecraft is a satellite.

The technical effects and advantages of embodiments of the computer program product and the system according to the present invention correspond, mutatis mutandis, to those of the corresponding embodiments of the method according to the present invention.

BRIEF DESCRIPTION OF THE FIGURES

These and other technical effects and advantages of embodiments of the present invention will now be described in more detail with reference to the accompanying drawings, in which.

DETAILED DESCRIPTION OF EMBODIMENTS THE INVENTION

Figure 1:
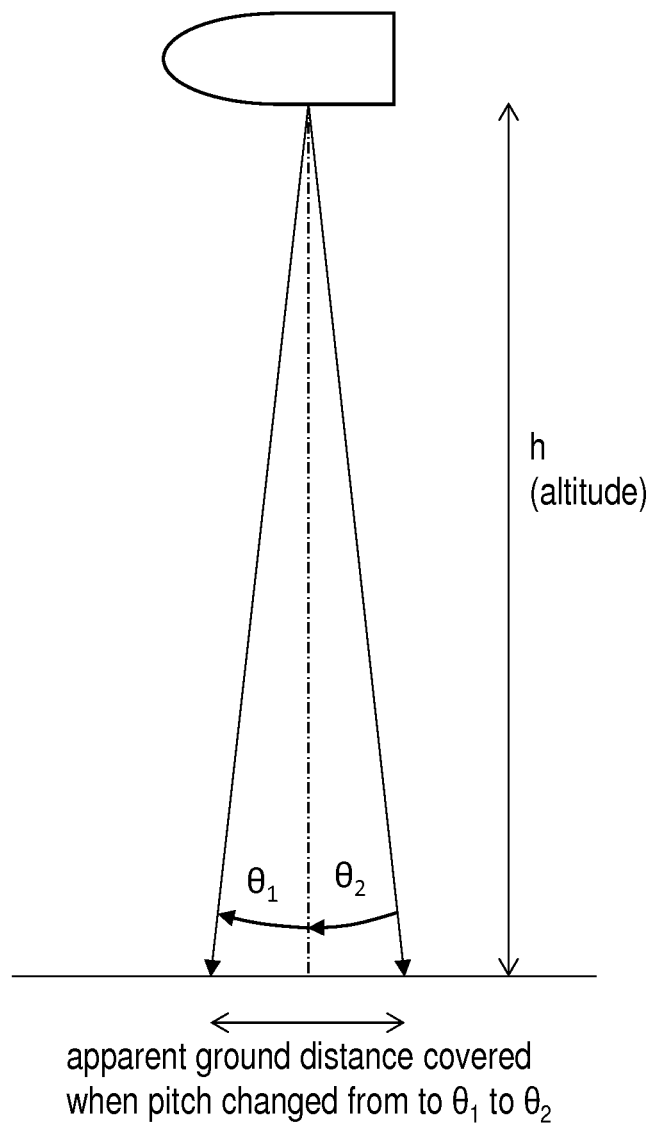
FIG. 1 schematically identifies relevant geometric variables used in calculations performed in embodiments of the present invention.

Traditionally, earth observation is being conducted from airborne and satellite platforms, each having specific advantages regarding parameters such as spatial resolution, ground coverage, availability and flexibility. Depending on the application, one platform is better suited than the other. Where parts of the following description refer to any specific type of platform, this is done for clarifying purposes only and without loss of generality. The various aspects of the present invention are not limited to any particular type of platform, unless explicitly indicated otherwise.

Various technological developments over the last decade have led to a new type of platform which bridges the gap between manned aircraft and satellites: a local geostationary system operated in the stratosphere. Various platform concepts, mostly airships or aircraft, are being developed aiming at persistent availability for earth observation as well as for telecommunications purposes. Besides the research performed regarding the platform, an additional challenge lies in the development of instruments which are adapted to the new specifications, environmental and operational conditions of those innovative platforms.

One initiative in this context consists of a lightweight high resolution camera, adapted to fly on a solar-powered high altitude long endurance unmanned aerial vehicle (UAV) at stratospheric altitudes around 18 km. Such an aircraft is powered by solar energy and high capacity batteries allowing it to fly for weeks or even months without landing. As such it can be used as local geostationary system, as it is able to remain above a region persistently. The platform is not bound to an orbit and moves at low speed in a region of the atmosphere where wind speeds are limited.

Target applications for such an aircraft include large scale mapping and disaster monitoring. The respective corresponding types of mapping are mapping of a large area with the aim of supplying a high quality image product of each location in the area once, and monitoring a small dedicated zone at a high temporal update rate where image products are supplied in near-real time with lower image quality but acceptable for the user.

In large scale mapping missions, time is devoted to achieve high quality imagery, including highly accurate geolocation and mapping, which allows to use the products for photogrammetric purposes. To achieve this, imaging with optimal overlap between successive images is used, as well as advanced mapping software In view of the goal to carry the camera system aboard a UAV, it must be adapted to operate under very challenging physical and environmental conditions. As the UAV platform is extremely low-weight (around 35 kg), the total allowed mass for the payload is also strict: for example 2 to 3 kg depending on the duration of the mission. The pressure at operational altitude may be around 60 mbar. The total power consumption may be limited to approximately 50 W during the day. No solar power is available at night, and all mechanical and electronics components have to survive severe thermal cycles with temperatures in worst cases down to −70° C. and up to 60° C. Thermal gradients and temperature evolutions are also experienced over the day, mainly due to the change in sun elevation and the direction of flight. In a particular configuration, the volume of the payload is restricted to a more or less cylindrical tube of 1 meter length with an outer diameter of 12 cm.

The lower stratosphere's environment is characterized by low air pressure (down to 60 mbar) and low relative humidity. The ambient temperature is low. Based on averaged temperature-data acquired above Belgium over a 20 year period we expect it to vary around −55° C. with a $3\sigma$ deviation of about 15° C.

Apart from the fluctuating air temperature, the temperature within the instrument is governed by two main heat sources: the sun (external) and electronic power dissipation (internal). In the absence of screening, the camera system experiences a strong temperature variation induced by the relative orientation of the sun with respect to the instrument.

An exemplary camera is designed along a horizontal axis to allow integration at the front of an exemplary UAV. The instrument may be divided into an optical compartment and an electronics compartment. The optical compartment houses a refractive optical system which may be equipped with several compensation systems to make the total optical system suitable for use on board of a stratospheric aircraft. The electronics compartment hosts the different electronic modules: CMOS sensor read-out and on-board computer, GPS receiver and antenna, inertial measurement unit and S-band data transmission system.

The aforementioned compensation systems of the refractive optical system may include a thermal compensation mechanism to adapt the focus position of the CMOS sensor relative to the optical system as a function of the temperature and pressure inside the payload. The pressure regime in the stratosphere (around 60 mbar) is different both from typical earth surface air pressure (around 1013 mbar) and from space (near vacuum). Moreover, during the duration of an UAV flight, which may span several months, the operational temperatures may cycle over a range of 40 to 50 K. Traditionally, airborne systems are pre-calibrated for the desired operational pressure range by adaptation before flight (on the ground). It is in an insight of the inventors that by providing active compensation for pressure and temperature variations in the optical system, the optical system can be used successfully at different altitudes, including different altitudes in the stratosphere, without requiring significant temperature insulation and pressure sealing. For this purpose, the aircraft or the instrument itself must be equipped with appropriate temperature and pressure sensors, a controller operatively connected to these sensors and configured to calculate a compensation value in function of the detected temperature and pressure values, and an actuator controlled by said controller to move at least one optical component in accordance with said compensation value so as to maintain a predetermined quality level of the image capturing performed by the optical system.

In addition, the system may be equipped with an actively actuated mirror that counters attitudinal changes of the camera (or the aircraft on which it is mounted). For this purpose, the aircraft must be equipped with appropriate attitude sensors as will described below.

Hyperspectral and geo-referencing sensors may be implemented according to the aforementioned international patent application publication WO 2011/073430 A1. Preferably, the sensors have a very wide aspect a ratio, such as for example 10000×1200 pixels with a pitch of 5.5 µm, whereby the two sensor elements are for example separated by a distance of 700 µm. Where the sensors are located on a single die, they are automatically very accurately aligned. The sensor may be equipped with micro-lenses to increase the light intensity on the sensitive area of the pixel. The elongated form factor of the CMOS sensor makes it very well suited for use in hyperspectral imaging. By arranging the long size of the sensor in the across direction, a wide-swath camera can be obtained. The 1200 lines along the short direction of the sensor can be exploited to project dispersed or filtered light in many different spectral bands, without providing unnecessary length in that direction, thus providing an adequate field of view with a very compact optical system. It should be noted that a similarly wide-swath sensor may be obtained by placing several sensors with a traditional aspect ratio (e.g. 1:1 or 1:2) side by side.

In order to correctly stitch successive images acquired during a survey, the images have to be co-registered, i.e. it is needed to find the transformation that makes the images best aligned. The method used to co-register the different images relies on parts of the images which image the same physical area on the ground for both images. To find such parts, sets of features are extracted from areas within each image. Next, feature sets from both images are compared and their similarities measured. The overall transformation coregistering the images can then be determined based on the best matching pairs of feature sets linking two images. Since this process relies on having parts common to both images, a certain amount of overlap between consecutive images is required.

The present invention is concerned with providing an adequate amount of overlap between consecutive images, while keeping the storage and/or transmission data rate requirements to a minimum.

Embodiments of the present invention rely on the availability of the altitude, geographical location (and in particular, the variation thereof, i.e. the ground speed), and the attitude (especially the pitch, i.e., the forward or backward inclination angle of the platform, and in particular, the variation thereof, i.e. the pitch rate) of the camera used for image acquisition. Where the camera is arranged in a fixed relationship to the aircraft or spacecraft carrying it, these variables correspond to the altitude, geographical location, and attitude of the aircraft or the spacecraft—without loss of generality, this will be assumed to be the case in the rest of this description.

Altitude and geographical location measurement techniques are well known to the skilled person. In the aircraft or spacecraft used for embodiments of the present invention, the attitude is preferably measured on board on a continuous basis by means of an inertial measurement unit (IMU), where recent advances in technology allow ever more accurate measurements even for small platforms. Additionally or alternatively, attitude and location parameters and their variations can also be estimated from the images themselves, or from images generated by a secondary camera provided for that purpose on the same platform. If the images of the primary camera can be used for the estimation of attitude parameters, this has the benefit of allowing the necessary information to be obtained without adding mass to the platform.

Platform attitude is expressed as orientation around three main axes (roll, pitch, and yaw), and attitude variations are expressed as angular motion around the axes. The pitch angle ($\theta$, see FIG. 1) describes the forward (or backward) pointing of the imager. The pitch angle translates into an apparent forward or backward displacement $x_{apparent}$ of the points being imaged.

Variations in the pitch (called pitch rate, the time derivative of pitch being designated as $q=d\theta/dt$) directly translate into an additional apparent forward speed on the ground, in function of the altitude of the aircraft (h, see FIG. 1):

$$v_{apparent}(t) = \frac{dx_{apparent}(t)}{dt} = \frac{d(h(t)\tan\theta(t))}{dt} = \tan\theta(t)\frac{dh(t)}{dt} + h(t)\frac{d(\tan\theta(t))}{dt}$$

We may assume that h(t) is constant for the relevant period of time:

$$h(t) = h \text{ so } \frac{dh(t)}{dt} = 0$$

This simplifies the expression for the apparent ground speed.

$$v_{apparent}(t) = h\frac{d(\tan\theta(t))}{dt} = \frac{h}{(\cos\theta(t))^2}\frac{d\theta}{dt} \quad \text{(Eq. 1)}$$

For small values of $\theta$, the $\cos^{-2}$ factor approaches 1. Therefore:

$$v_{apparent}(t) \approx h\frac{d\theta}{dt} = h \cdot q \quad \text{(Eq. 2)}$$

Figure 2:
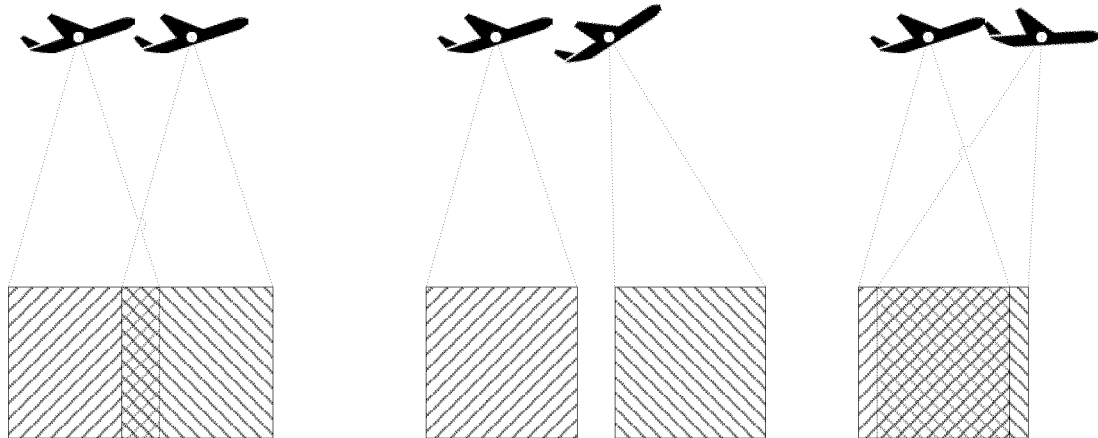
FIG. 2 schematically illustrates an effect of pitch variations on the amount of overlap in consecutive aerial images.

The relative importance of the attitude speed $v_{apparent}$ to the total speed $v_{total}$ increases with increasing q, and for higher altitudes h and for lower nominal speeds $v_{nominal}$. A positive $v_{apparent}$ adds to the $v_{nominal}$ and increases the total forward speed $v_{total}$, whereas a negative $v_{apparent}$ decreases or inverses $v_{total}$. This is schematically illustrated in FIG. 2, where the left part illustrates perfect attitude, the middle part illustrates a pitch increase causing a gap, and the right part illustrates a pitch decrease causing unnecessary large overlap.

Figure 3:
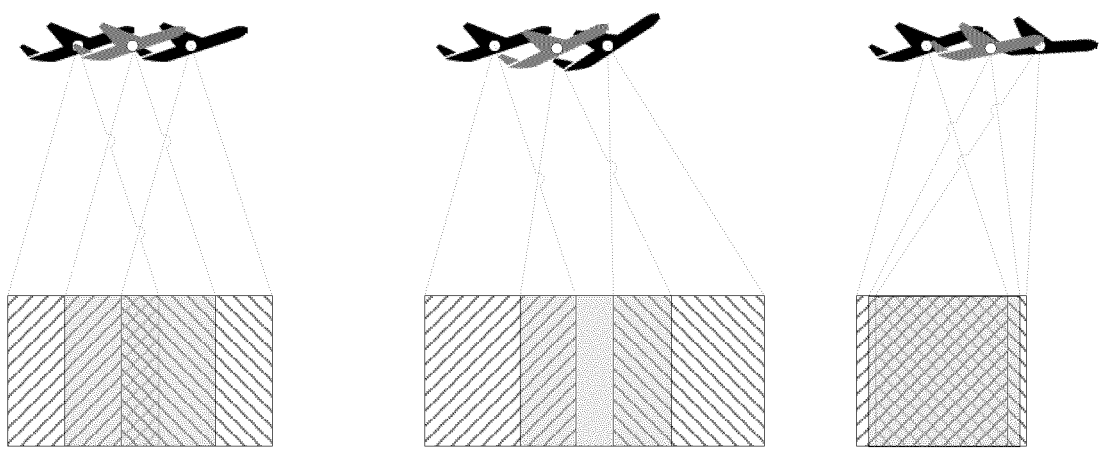
FIG. 3 schematically illustrates an effect of pitch variations on the amount of overlap in consecutive aerial images.

The expected pitch variation is typically bounded by a maximal value $q_{max}$, which translates to a maximal apparent forward speed $v_{total,max}=v_{nominal}+v_{apparent}(q_{max})$. By selecting the frame rate to accommodate $v_{total,max}$ instead of $v_{nominal}$, it can be ensured that no gaps occur. This is illustrated in FIG. 3. For the case shown in the middle part of FIG. 3, the gap is avoided by the higher frame rate. For the left and right parts, the added frames are not useful.

Yaw describes the rotation around the vertical axis. For a nadir looking imager, yaw variations do not impact the pointing for a pixel placed exactly on the position of the axis of rotation. For all other pixels, rotation causes an additional apparent movement proportional to the distance to the axis $d_{axis}$. The displacement $d_{yaw}$, caused by a rotation angle $\varphi$ is:

$$d_{yaw}(\varphi)=\sin\varphi \cdot d_{axis}$$

This causes an additional apparent speed:

$$v_{yaw,apparent} = \frac{(\sin\varphi_1 - \sin\varphi_0) \cdot d_{axis}}{t_1 - t_0}$$

for small values of $\varphi$, we can approximate: $\sin(\varphi)\sim\varphi$, and express $v_{yaw,apparent}$ in function of the yaw variation $r=d\varphi/dt$:

$$v_{yaw,apparent} = \frac{d\varphi}{dt} \cdot d_{axis} = r \cdot d_{axis}$$

The distance to axis $d_{axis}$ varies between pixels. For overlap calculations, the maximal distance should be taken into account. Except for systems with a very wide swath, the $v_{yaw,apparent}$ will be small compared to the $v_{apparent}$ from pitch variations Roll describes the rotation around the horizontal forwards pointing axis. Roll variations impact the pointing towards left or right. As such, they change the "distance_to_axis" as used above. Typically, this has only a minor impact on the maximal apparent forward speed and in most cases, it can be neglected in the calculations.

Figure 4:
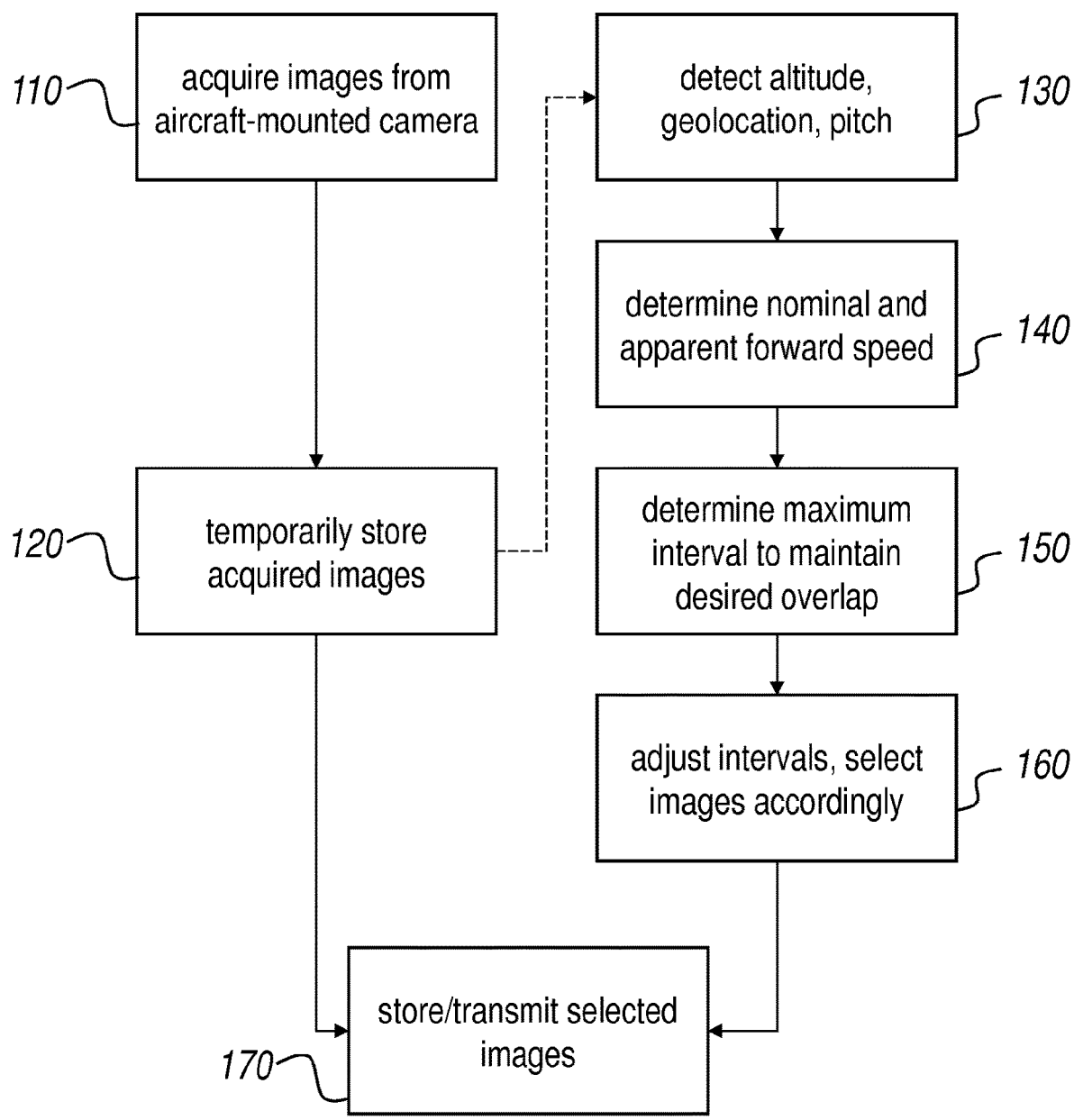
FIG. 4 presents a flow chart of an embodiment of the method according to the present invention.

An embodiment of the method according to the present invention will now be described with reference to the flow chart presented in FIG. 4. The method allows for taking a series of partially overlapping images of the earth's surface from a camera arranged in an aircraft. The camera has a known viewing angle, which is used to determine the (expected) amount of overlap between consecutive images.

While the aircraft is moving, a plurality of images is acquired 110 with said camera at different instants in time, the different instants in time being separated by a series of time intervals. Preferably, the images are acquired at a fixed, very high frame rate. These images are temporarily stored (buffered) 120 aboard the aircraft.

During the movement of the aircraft, the altitude, geographical position, and pitch (i.e. the angular positional deviation around a transverse axis of the aircraft) of the aircraft are detected 130, and optionally stored if this is necessary to use these variables for non-real-time processing. The detection can take place by means of dedicated sensors, by analyzing the images captured by the camera (this is represented by the dashed arrow between image storage 120 and attitude detection 130), or by analyzing images captured by a secondary camera provided for this purpose.

The basic positional and attitudinal variables should be detected at a sufficient level of accuracy and temporal resolution to allow the derivation of ground speed and pitch rate; alternatively, ground speed and pitch rate may be detected and/or stored directly. Other parameters that influence the area imaged on ground, such as a variable nominal forward speed or other attitude parameters (roll, yaw), may be recorded and used in further calculations, if the application so requires.

Altitude, pitch rate, and ground speed are then used to determine the total forward speed 140, as described above in Equations 1 and 2. Together with the known viewing angle of the camera, the maximal time intervals between frames for which a predetermined amount of spatial overlap can be obtained may be determined 150. The intervals between the captured frames may then be adjusted 160 towards the maximal values so as to minimize the number of said acquired images while maintaining the predetermined amount of spatial overlap. In the illustrated embodiment, this adjustment 160 consists of the selection of a subset of the buffered images, such that the time intervals between consecutive selected images don't exceed the maximum determined in step 150. Thus, a minimal number of images is retained 170 while maintaining the predetermined amount of spatial overlap. Preferably, a margin is deducted from the maximal interval values prior to the selection step, to avoid obtaining gaps when $v_{apparent}$ (q) is underestimated due to measurement inaccuracies affecting the attitudinal variables.

The actual calculations performed in steps 140-150 be carried out as follows.

The desired amount of overlap between consecutive images may be represented by the variable $d_{max}$, i.e. the maximal allowed forward distance between successive images (this corresponds to the forward ground size of one image minus the desired overlap, where the forward ground size of an image may be determined in function of the viewing angle and the altitude).

Given the time instant of the captured image under consideration, t, and the time instant of the preceding image, $t_{previous}$, the contribution of the pitch rate to the perceived forward movement, $d_{pitch}$, may be expressed as $$d_{pitch}(t,t_{previous})=h(\tan \theta(t)-\tan \theta(t_{previous})) \quad \text{(Eq. 3)}$$

while the contribution of the nominal ground speed, $d_{nominal}$, may be expressed as $$d_{nominal}(t,t_{previous})=v_{nominal} \cdot (t-t_{previous}) \quad \text{(Eq. 4).}$$

Figure 5:
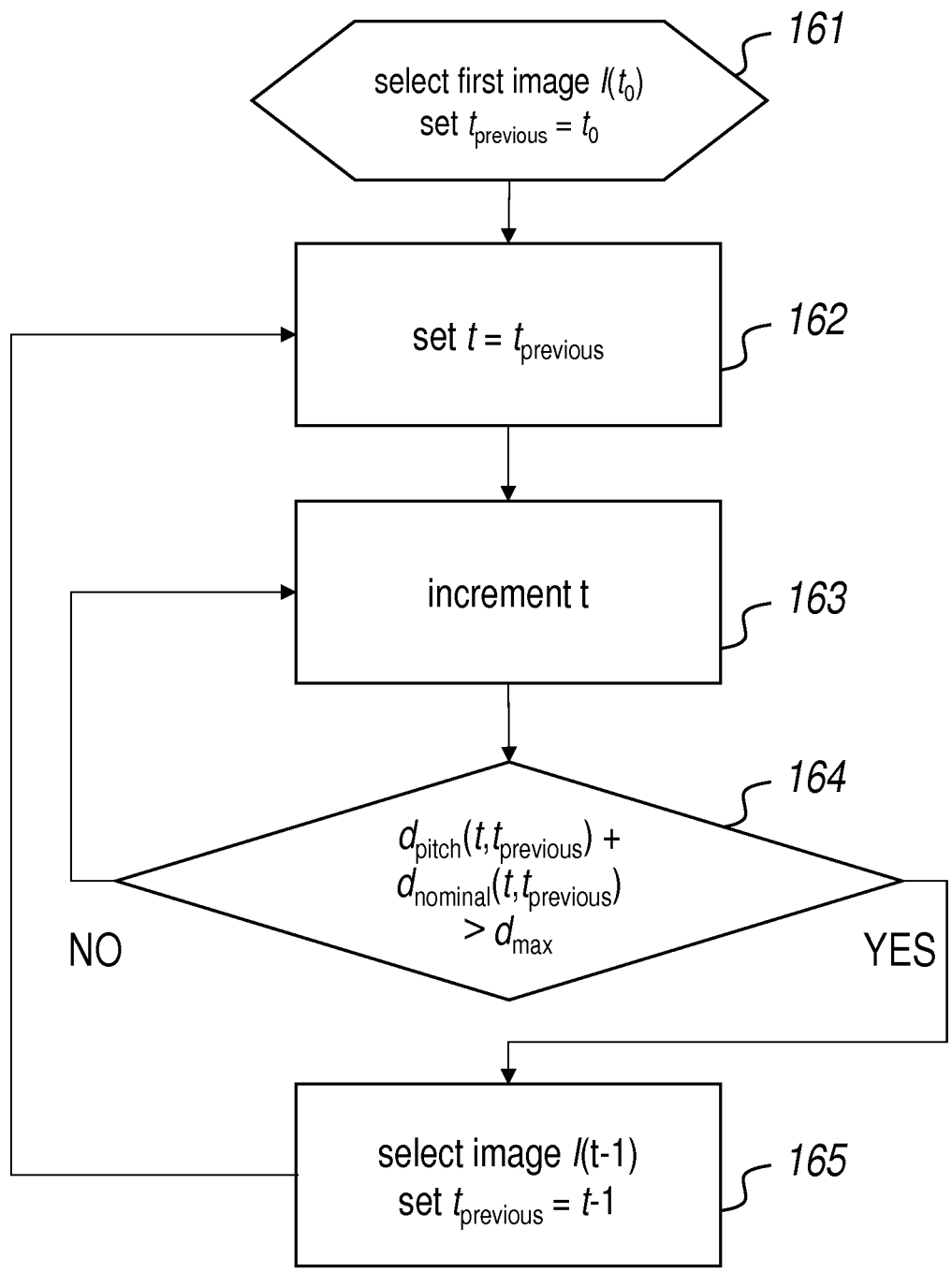
FIG. 5 presents a flow chart of an algorithm that may be used in an embodiment of the method according to the present invention.

The selection algorithm then proceeds as illustrated in FIG. 5: In a preparatory step 161, a first image $I(t_0)$ is selected, and the time instant of that image is stored as the initial value of $t_{previous}$. The time iterator t is set to start at $t_{previous}$ in step 162, and is incremented 163 until it reaches the point where $d_{pitch}+d_{nominal}$ exceeds $d_{max}$ 164. When this is the case, the last value of t before $d_{max}$ is exceeded is the time index of the next image I(t−1) to be selected 165. This succession of steps 162-165 is repeated for all stored images.

During the integration time of a single image, the platform moves and its pointing can change, which leads to a certain amount of motion blur. In the system according to the present invention, attitude variation rate information is available for every image, which can be used to estimate the expected motion blur. The image selection mechanism can therefore be adapted so that estimated motion blur is also used as a criterion; it can prefer to select images with lower motion blur. By doing so, an image subset is obtained with a lower average motion blur and more consistent sharpness between images. Referring to the flow chart of FIG. 5, the selection step 165 may be adapted to select the best image (i.e., with the least expected blur) from among the frames between $t_{previous}$ and t−1, and to continue the algorithm with that selected value. Alternatively, the selection may be done from among the frame at t−1 and a predetermined number of frames immediately preceding that frame.

In practice, the algorithm is applied to a buffer of images. The buffer is continuously updated by adding new acquisitions. The selection proceeds and reserves selected images for longer term storage and/or transmission. The images that are not selected may be discarded.

Figure 6:
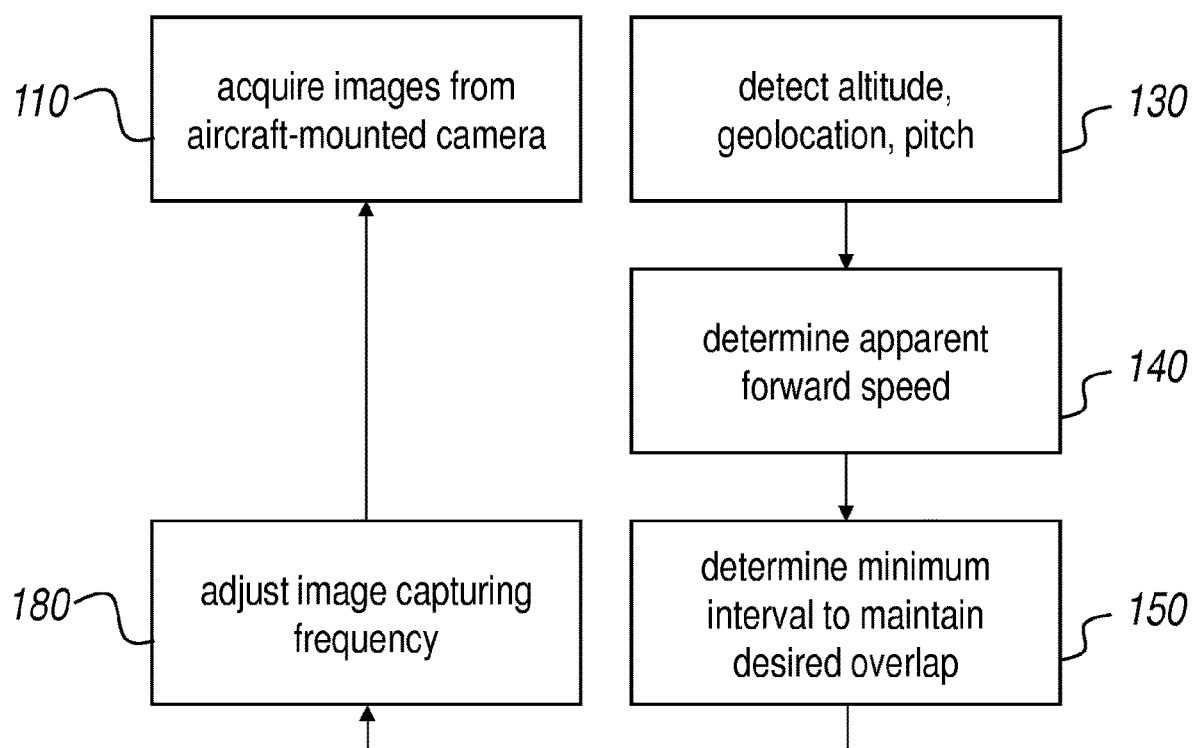
FIG. 6 presents a flow chart of another embodiment of the method according to the present invention.
Figure 7:
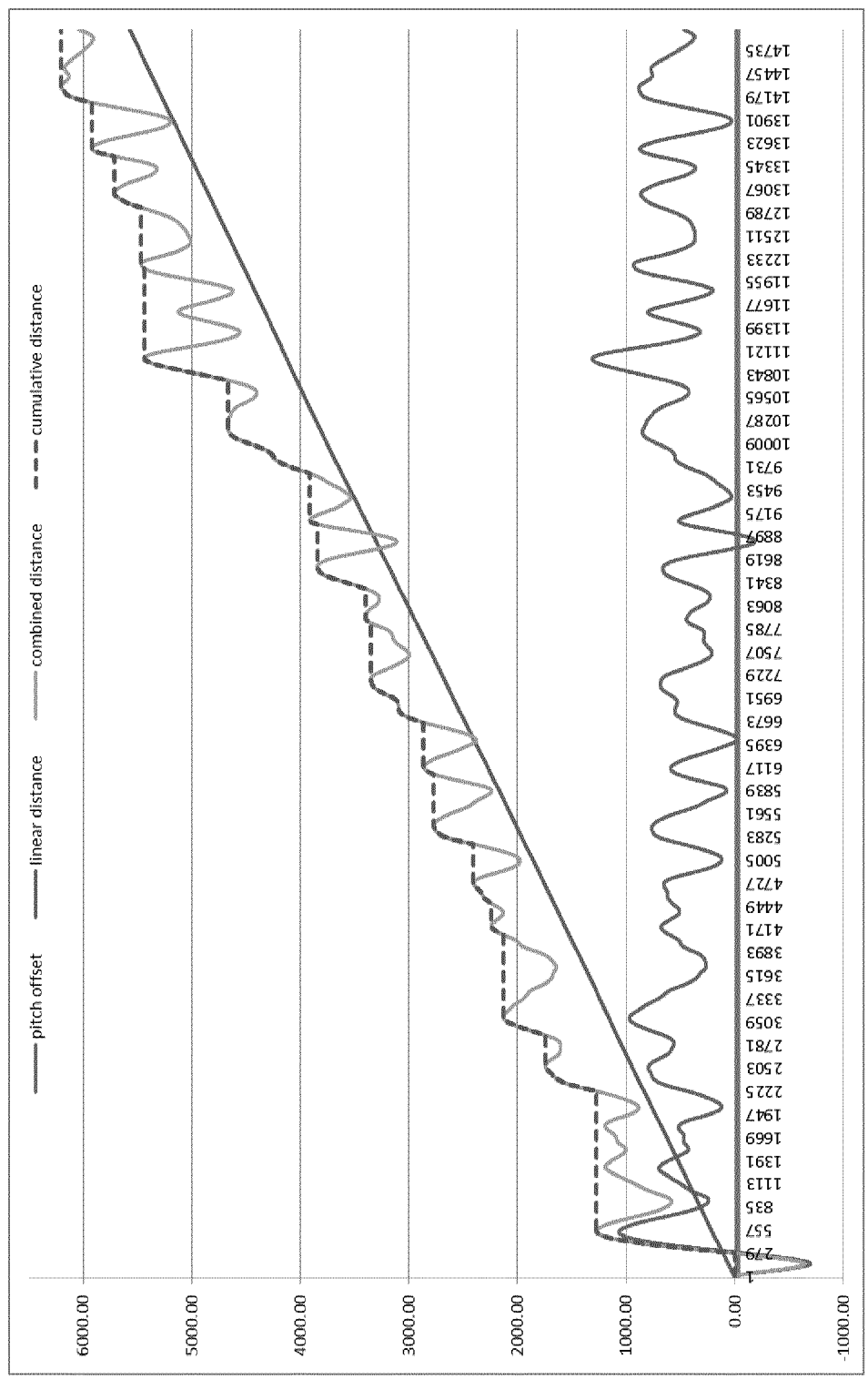
FIG. 7 is a plot representing the results of a simulated application of an embodiment of the method according to the present invention.

FIG. 6 presents an alternative embodiment of the method according to the present invention. For the sake of brevity, elements in common with the embodiment of FIG. 4, will not be repeated here. Instead of capturing images at a fixed high frequency, the acquiring of the images 110 comprises capturing images at a variable capturing frequency. The intervals between frames are adapted in real-time in function of the determined apparent forward speed, such that the capturing frequency becomes variable 180. While this alternative embodiment further reduces the need for buffering or storage of unnecessary images, it requires real-time processing of the attitudinal variables and immediate feedback to the camera; hence, the real-time computational resources required for this embodiment are more significant than those required for the embodiment of FIG. 4. The invention may be further clarified by means of the following simulated numerical example, the results of which are summarized in the plot of FIG. 7. We assume a slow-moving platform (less than 20 m/s), flying at high altitude (20000 m) with randomly simulated pitch variations (standard deviation of pitch: 0.3°/s). The horizontal axis represents the indices of the captured frames over a distance covered by the platform over a period of 300 seconds with a frame rate of 50 frames/s. On the vertical axis, we show the distance as would be covered by the nominal speed (in red), the distance variations due to pitch (in blue), and the combined distance (in green). In the illustrated example, speed variations due to pitch variation are larger than the nominal platform speed. In this case, the combined movement is reversed for parts of the time period. As a result, new areas are covered only for some part (about ¼ of the total time in the example). In the other parts, the same areas are revisited either by backward or forward movement. The plot of the cumulative distance (shown in the dotted line) illustrates this, in that it is horizontal except when new areas are covered.

Using the algorithm presented earlier, only those frames need to be selected that cover new areas. In the illustrated example, this would yield a reduction of the data to be stored and/or transmitted of about 75%.

Figure 8:
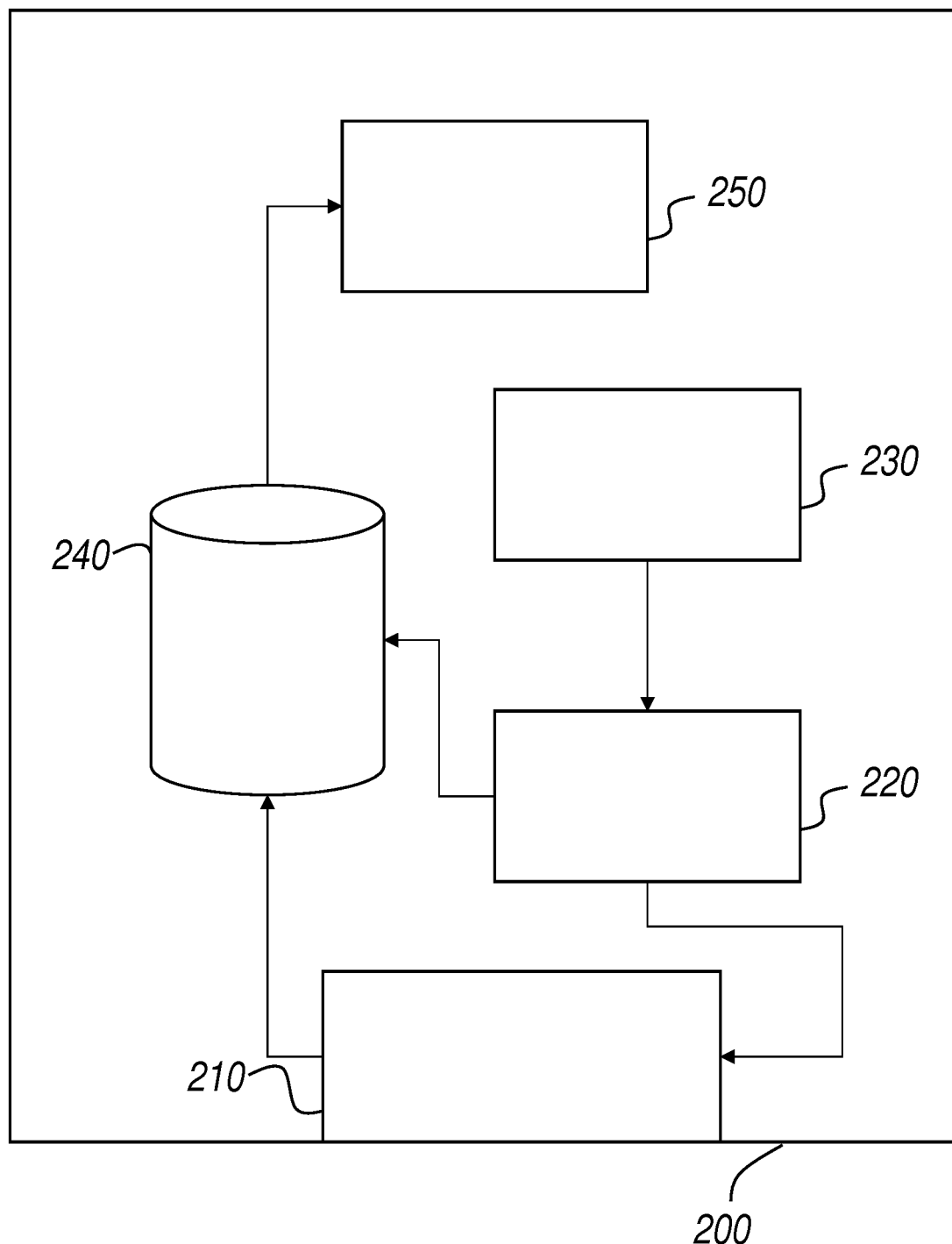
FIG. 8 schematically illustrates an embodiment of the system according to the present invention.

FIG. 8 schematically illustrates an embodiment of the system according to the present invention. The computational steps of the method described above are performed by a controller 220. The controller 220 may be implemented in dedicated hardware (e.g., ASIC), configurable hardware (e.g., FPGA), programmable components (e.g., a DSP or general purpose processor with appropriate software), or any combination thereof. The same component(s) may also include other functions. The controller 220 facilitates the taking of a series of partially overlapping images of the earth's surface from a camera arranged in an aircraft, and is configured to obtain an altitude, a geographical position, and a pitch of the aircraft during a movement, by interfacing with appropriate sensors 230, such as a GPS receiver and an IMU. The controller 220 is further configured to use the altitude, the geographical position, the pitch, and the viewing angle of the camera to determine maximal values of time intervals for which images with a predetermined amount of spatial overlap can be obtained, in accordance with the methods described in more detail above, and adjusts time intervals between consecutive images maximized towards the maximal values so as to minimize the number of images required to maintain a predetermined amount of spatial overlap.

The controller 220 may be part of a system for taking a series of partially overlapping images of the earth's surface, which system further comprises a camera 210 arranged in an aircraft 200.

The controller 220 may be arranged to control the image acquisition rate of the camera in accordance with the calculated time intervals, or it may control storage and/or transmission of a subset of images acquired at a fixed frame rate, the subset being selected in accordance with the calculated time intervals. The system may comprise appropriate storage media 240 and/or transmission means 250 for the purpose of making the selected images available to the end user.

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

The invention claimed is:

1. A method for taking a series of partially overlapping images of a ground surface from a camera arranged in an aircraft or a spacecraft, said camera having a viewing angle, the method comprising:
    while said aircraft or said spacecraft is moving, acquiring a plurality of images with said camera at different instants in time, said different instants in time being separated by a series of time intervals;
    detecting, during said moving, position information representative of a position of said aircraft or said spacecraft and orientation information representative of an orientation of said aircraft or said spacecraft;
    using said position information, said orientation information, and a viewing angle of said camera to determine maximal values of said time intervals for which images with a predetermined amount of spatial overlap are able to be obtained; and
    adjusting said intervals towards said maximal values so as to minimize the number of said acquired images while maintaining said predetermined amount of spatial overlap,
    wherein said acquiring comprises capturing images at a fixed capturing frequency and temporarily storing said captured images; and wherein said adjusting of said intervals comprises discarding images from among said captured images so as to retain a minimal number of said images while maintaining said predetermined amount of spatial overlap.

2. The method according to claim 1, further comprising transmitting said minimal number of said images from said aircraft to a ground station.

3. The method according to claim 1, wherein said determining comprises calculating an apparent ground speed as a sum of a variation of said geographical position and the product of said altitude and either a variation of the tangent of said pitch or a mathematical approximation thereof.

4. The method according to claim 1, wherein said position information includes at least an altitude and a geographical position, and said orientation information includes at least a pitch; and wherein said using of said position information and said orientation information to determine said maximal values of said time intervals comprises using said altitude, said geographical position, and said pitch to determine said maximal values of said time intervals.

5. The method according to claim 1, wherein a variation of said pitch is derived from consecutive ones of said plurality of images or from consecutive ones of a plurality of reference images acquired for that purpose by means of a secondary camera arranged in said aircraft or said spacecraft.

6. A non-transitory computer program product comprising code means configured to cause a processor to carry out the method according to claim 1 when executed.

7. A controller for facilitating the taking of a series of partially overlapping images of a ground surface from a camera arranged in an aircraft or a spacecraft, said controller being configured to:
    acquire, while said aircraft or said spacecraft is moving, a plurality of images with said camera at different instants in time, said different instants in time being separated by a series of time intervals;
    obtain during said moving, position information representative of a position of said aircraft or said spacecraft and orientation information representative of an orientation of said aircraft or said spacecraft;
    use said position information, said orientation information, and a viewing angle of said camera to determine maximal values of said time intervals for which images with a predetermined amount of spatial overlap are able to be obtained; and
    calculate time intervals between consecutive images maximized towards said maximal values so as to minimize the number of images required to maintain a predetermined amount of spatial overlap, wherein said acquiring comprises capturing images at a fixed capturing frequency and temporarily storing said captured images; and wherein said adjusting of said intervals comprises discarding images from among said captured images so as to retain a minimal number of said images while maintaining said predetermined amount of spatial overlap.

8. The controller according to claim 7, wherein said position information includes at least an altitude and a geographical position, and said orientation information includes at least a pitch; and wherein said using of said position information and said orientation information to determine said maximal values of said time intervals comprises using said altitude, said geographical position, and said pitch to determine said maximal values of said time intervals.

9. A system for taking a series of partially overlapping images of a ground surface, the system comprising:
- a camera arranged in an aircraft or a spacecraft, the camera being configured to acquire images at a fixed image acquisition rate;
- the controller according to claim 7, arranged to control storage and/or transmission of a subset of said acquired images in accordance with said calculated time intervals.

10. The system according to claim 9, wherein said aircraft or said spacecraft is an unmanned aerial vehicle.

11. The system according to claim 9, wherein said aircraft or said spacecraft is an air ship.

12. The system according to claim 9, wherein said aircraft or said spacecraft is a satellite.

* * * * *